Figure 1:
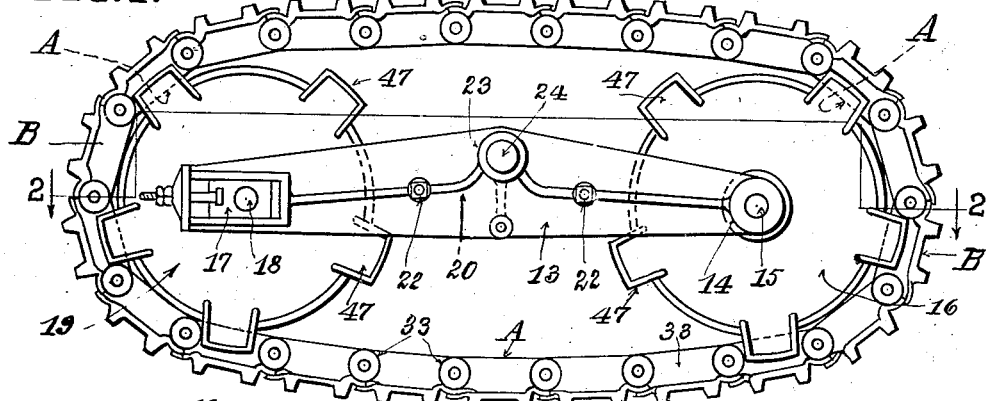

O. C. HOUGHTON.
ENDLESS TRACK BAND FOR MOTOR VEHICLES.
APPLICATION FILED OCT. 13, 1917.

1,278,150.

Patented Sept. 10, 1918.
2 SHEETS—SHEET 1.

WITNESSES:
J. E. Stark.
Al. Stark.

INVENTOR:
ORLEY C. HOUGHTON.
BY Michael J. Stark & Sons
ATTORNEYS.

O. C. HOUGHTON.
ENDLESS TRACK BAND FOR MOTOR VEHICLES.
APPLICATION FILED OCT. 13, 1917.

1,278,150.

Patented Sept. 10, 1918.
2 SHEETS—SHEET 2.

WITNESSES:
E. Stark
Al. Stark

INVENTOR:
ORLEY C. HOUGHTON,
BY Michael J. Stark & Sons,
ATTORNEYS.

UNITED STATES PATENT OFFICE.

ORLEY C. HOUGHTON, OF CHICAGO, ILLINOIS, ASSIGNOR TO FREDERICK C. AUSTIN, OF CHICAGO, ILLINOIS.

ENDLESS TRACK-BAND FOR MOTOR-VEHICLES.

1,278,150.  Specification of Letters Patent.  Patented Sept. 10, 1918.

Application filed October 13, 1917. Serial No. 196,406.

*To all whom it may concern:*

Be it known that I, ORLEY C. HOUGHTON, a citizen of the United States, and a resident of the city of Chicago, in the county of Cook and State of Illinois, have invented a certain new and useful Improvement in Endless Track-Bands for Motor-Vehicles; and I do hereby declare that the following description of my said invention, taken in connection with the accompanying sheet of drawings, forms a full, clear, and exact specification, which will enable others skilled in the art to which it appertains to make and use the same.

My invention relates generally to improvements in endless track bands for motor vehicles; and it consists, essentially, in the novel and peculiar combination of parts and details of construction, as hereinafter first fully set forth and described and then pointed out in the claims.

The object of this invention is the production of an efficient, serviceable, and durable endless track band or belt, which, while designed for general use on motor vehicles, such as automobiles, motor trucks, and traction engines, is especially well adapted for employment in trailers for traction engines and motor trucks, which trailers are not provided with a motor, and do not have steering wheels or means for steering the same.

A further object of this invention is the production of an endless track band which shall be self-sustaining, i. e. require no supporting wheels for the upper stretch of the belt, nor track wheels to sustain the superstructure of the machine on which the endless track is employed.

Another object of this invention is an endless track band in which the individual members of said band are provided with means for taking up the stretch or slack in the band, such as will occur in the course of time.

Still another object of this invention is an endless track band which, in normal condition shall be curved in such a manner that when the belt is trained over a pair of wheels, the lower stretch thereof shall be curved with the highest point in the curve approximately medially of the said pair of wheels, which will greatly facilitate the turning of the vehicle without dragging the belt over the ground.

Other objects of my invention will hereinafter appear.

Figure 2:
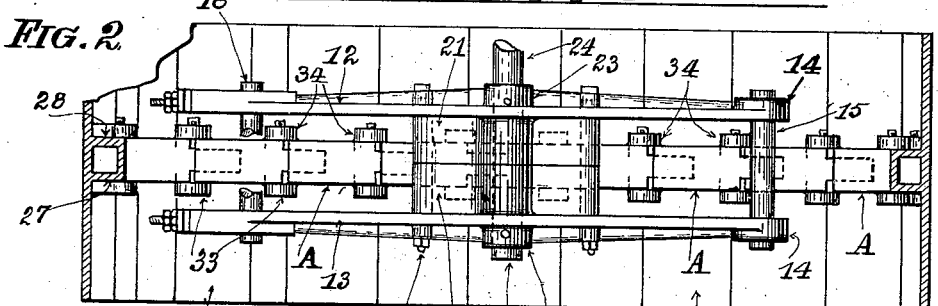
Figure 3:
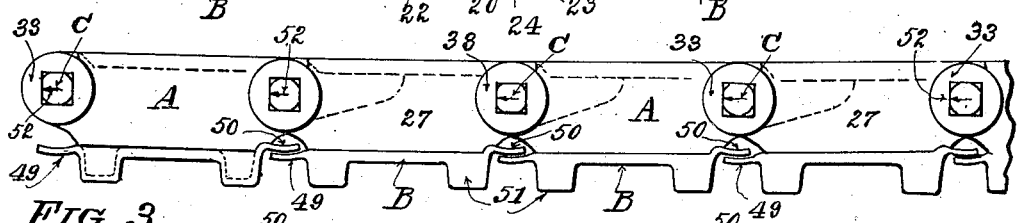
Figure 4:
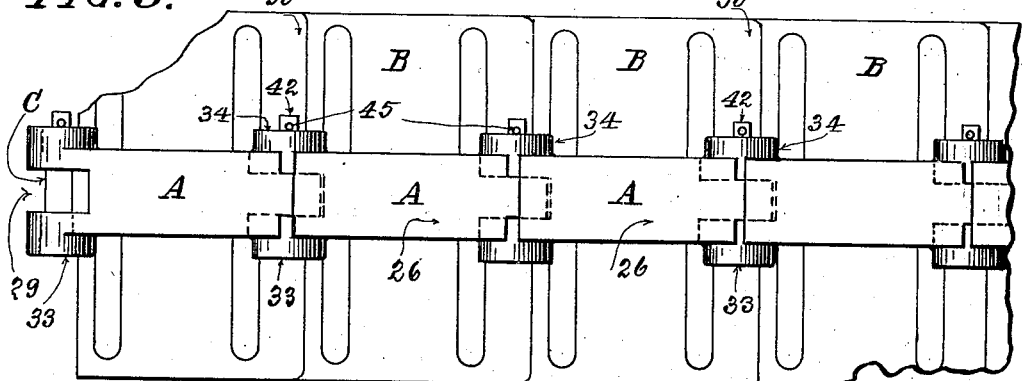
Figure 5:
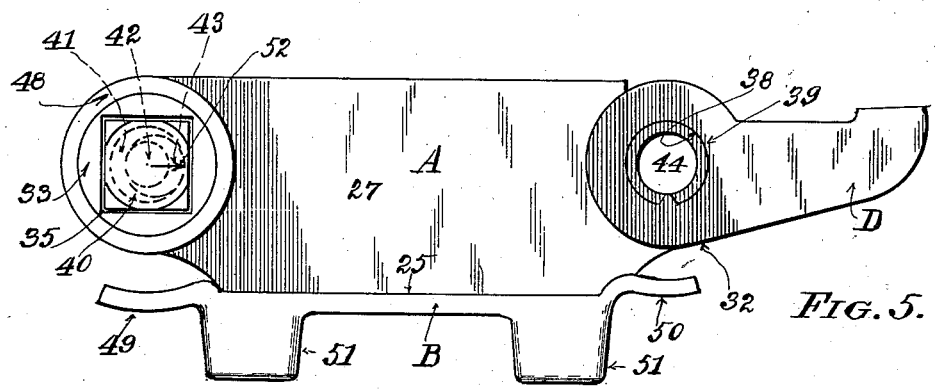
Figure 6:
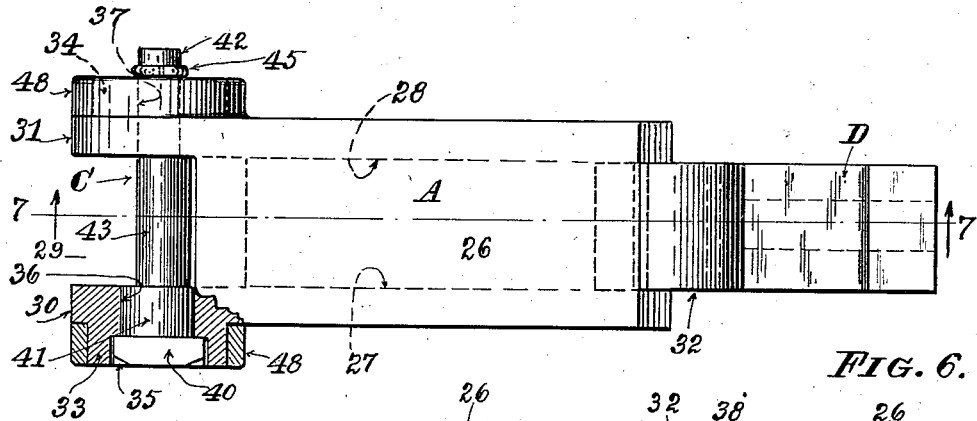
Figure 7:
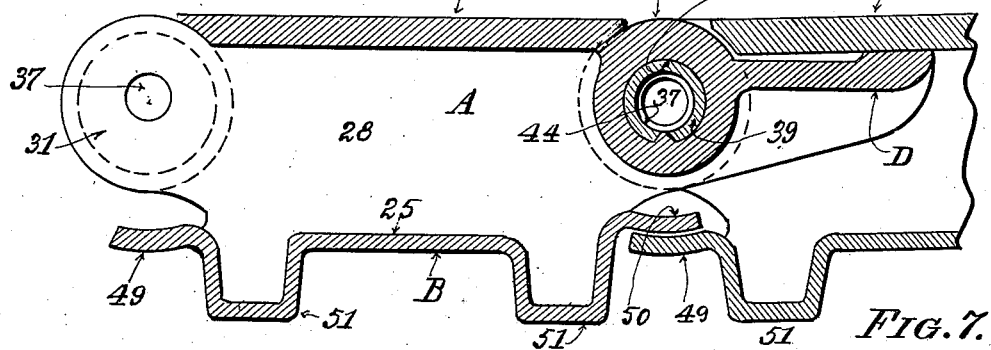
Figure 8:
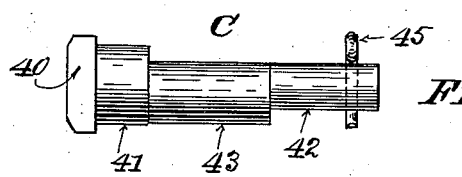
Figure 9:
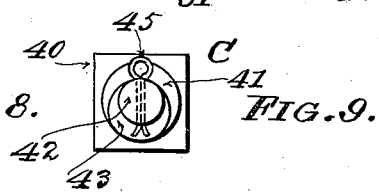

To accomplish these objects, I construct this endless track band, in the preferred embodiment of my invention, as shown in the drawings forming a part of this specification, and in which Figure 1 is a side elevation of my improved endless track band as applied to a truck having band wheels over which the endless track band is trained. Fig. 2 is a sectional plan of the same, on the indirect line 2—2 of Fig. 1, the band wheels over which the endless track band is stretched, being omitted. Fig. 3 is a side elevation on an increased scale, of a portion of the endless track band; and Fig. 4 is a plan of the same. Fig. 5 is a side elevation of one of the members of the band detached. Fig. 6 is a plan of the same, the treads or shoes being omitted. Fig. 7 is a longitudinal vertical section on line 7—7 of Fig. 6. Fig. 8 is a plan of one of the eccentric bolts employed in this track band for taking up slack therein; and Fig. 9 is an end view of the same.

Like parts are designated by the same characters and symbols of reference in all the various figures.

The truck on which this endless track band is mounted may be of any desired construction which is suitable for motor driven vehicles, the one shown in Figs. 1 and 2 being given as an exemplification of a truck which is especially well adapted for a trailer, and which truck includes two members 12, 13, in parallel spaced relationship, said members having at one extremity bearings 14, for the reception of a shaft 15, on which there is mounted one of the band wheels 16, heretofore mentioned, said members 12, 13, having at their other ends bearings 17, in which is journaled a shaft 18, on which the second band wheel is secured. These two members 12, 13, are, preferably, castings, from the opposing inner sides of which extend plates 20, 21, which meet approximately medially of the space between the two members, and thus space them apart, bolts 22, being provided to securely tie the two members to each other, thus affording a very substantial and rigid structure.

Medially, the members 12, 13, have tubular bosses 23, to receive an axle 24, on which the truck may oscillate, said axle being constructed to support a traction machine, or other vehicle on which the endless track band is to be employed. This vehicle forms no part of my present invention, and a showing thereof is, therefore omitted.

The endless track band comprises a series of links A, each of which is provided with a plate B, preferably cast integrally with its link member, said plate performing the function of a shoe or tread, on which the structure is supported. Each of these link members, which are of the hermaphrodite type, is a box-like casting having, as best shown in Figs. 5, 6, and 7, a bottom member 25, a top member 26, and two side members 27, 28. This box has at one end a notch or opening 29, constituting, in conjunction with side-lugs 30, 31, the female portion of the link, and at the other end a reduced portion 32, forming the male part of the link, and which enters the notch 29 to form the articulation of the band. From the side-members 27, 28, and at the female part of the link, extend bosses 33, 34, the boss 33 having in its outer face a polygonal recess 35, and a cylindrical bore 36; and the boss 34 having centrally, and alined with the bore 36, a smaller bore 37. The boss 32, forming the male part of the link has a central cylindrical bore 38, preferably lined with a hardened steel bushing 39. These links are hingedly connected to each other by bolts C, shown in detail in Figs. 8 and 9, each of said bolts having a head 40, engaging the recess 35 in the boss 33, and adjacent of this head there is a cylindrical part 41, engaging the bore 36, while a terminal cylindrical portion 42 of the bolt, which is in axial alinement with the portion 41, engages the bore 37 in the lug 31 and boss 34. Between the two cylindrical portions 41, 42, there is a cylindrical portion 43, the axis of which is eccentric to the portions 41, 42, and engages the bore 44 in the bushing 39. This bolt C is held in position by a cotter pin 45, or other suitable means, the cotter pin being preferred on account of ease of removal and insertion.

It will now be noted that the bolt C is normally nonrotatably held in position in the link by its polygonal head in the polygonal recess 35. When first assembled, this bolt is placed in such a position that the eccentric portion thereof projects away from the male part of the link and, therefore, affords the normal distance between these two points. But, as wear occurs this bolt may be longitudinally moved, (by withdrawing the cotter pin 45) to clear the head 40 from the recess 35, and then rotated a part of a full turn, which will draw the adjacent link toward the link in which the bolt has been rotated, and thereby shorten the distance between these links; and this operation may be repeated as often as required, depending upon the shape of the bolt head 40, until the eccentric portion 43 is in the terminal position shown in Fig. 6, when no further taking-up of slack can be made. As illustrated in the figures, the head of this bolt is a so-called square head, permitting of two changes of position being made; when hexagonal, there would be three changes possible, and when octagonal there would be four changes, the final result however, being the same in all cases and depending upon the throw of the eccentric.

Each male part 32 of the links has an extension D, reaching well toward the middle of the next succeeding link. This extension D bears normally upon the under side of the forward part of the top wall 26, as best seen in Fig. 7; and it is so constructed that the next succeeding link is slightly at an angle to the first link, whereby the belt will have a pronounced curvature, as shown in Fig. 7, wherein the angularity is, however, slightly exaggerated to more clearly show this condition; and in Figs. 1 and 3, wherein this curved condition is shown as the belt appears when applied to the truck. Of course, after a slight wear or stretch of the belt, this curve will somewhat flatten, but this can be readily corrected in the manner hereinbefore described, by the eccentric bolts C.

In order to prevent the endless track band from side-wise movement on the band wheels 16, 19, these wheels are provided with radially projecting wings 47, Fig. 1, which engage the sides 27, 28, of the links; and when these band wheels, or either one thereof is used as a driver in a motor vehicle, these wings are so planned that they engage the side-wise extending bosses 33, 34, of the links; and in order to prevent wear as much as possible, these bosses 33, 34, are then provided with hardened steel bands 48, as shown in Figs. 5 and 6, shrunk onto, or otherwise secured to, the said bosses.

The marginal transverse edges of the treads B are concavo-convex in contour, the margin 49 being concave, and the margin 50 being convex, and overlying the concave 49. This construction serves primarily to prevent dirt, sand, and other objectionable matter from entering between adjacent ends of the treads, and also to stiffen these marginal edges; and to further stiffen the treads, there are formed thereon projections 51, which also serve as anchors to prevent the endless track band from sliding when the same is placed upon soft ground.

To avoid wear as far as possible, the bolts C are made from hardened steel; and they may be made from manganese steel in the process of casting, and subsequent grinding when necessary, machining not being feasible when made from manganese steel; and to provide for means whereby the position of the eccentric portion of the bolt may be readily observed, I provide the head of the bolt with some indicating mark, such as 52, or any other index which will produce the desired result.

I have hereinbefore described the preferred embodiment of my invention, but I desire it to be understood that changes may be made therein, and parts omitted, without departing from the scope of my invention as defined in the subjoined claims.

Having thus fully described this invention, I claim as new, and desire to secure to myself by Letters Patent of the United States—

1. An endless track band, comprising, a multiplicity of links, each link being box-shaped, each link being provided with an integrally-formed tread, said link being of the hermaphrodite type, there being at the female end of each link laterally extending bosses, there being mounted in said bosses a bolt, said bolt having an eccentric engaging the male part of an adjacent link, and means for preventing rotation of said bolt.

2. An endless track band comprising a multiplicity of links, each link being provided with a tread and a male and two female members, said links being connected by bolts, each bolt including a head, a large cylindrical portion adjacent said head, an eccentric portion adjoining said cylindrical portion, and a reduced terminal cylindrical portion, the two cylindrical portions being in axial alinement and constructed to engage the two female members, while the eccentric portion engages the male member of an adjacent link.

3. An endless track band comprising, a multiplicity of hermaphrodite links, each link being provided with a tread, the female portion of each link having laterally extending bosses, one of said bosses having a polygonal recess and a cylindrical bore, the other of said bosses having a cylindrical bore smaller in diameter than the first-mentioned bore, the male portion of said link having a cylindrical bore of smaller diameter than the first-mentioned bore, but larger than the bore in the second boss, and a bolt, said bolt having a polygonal head, a cylindrical portion adjacent said head, an eccentric portion, and a terminal cylindrical portion, said bolt connecting adjacent links.

4. In an endless track band, pivotally connected links, each link having a tread formed integrally with the link, said links being of the hermaphrodite type, said links being of box shape, there being formed on the male part of each link an extension entering the interior space of an adjacent link and normally bearing on the under side of the top of said box-shaped link, whereby said links are permitted to articulate in one direction, but prevented from articulation in the opposite direction.

5. An endless track band, comprising, pivotally connected links, each link having a tread formed integrally with the link, said links being of the hermaphrodite type, said links being of box shape, there being formed on the male part of each link an extension entering the interior space of an adjacent link and normally bearing on the under side of the top of said box-shaped link, whereby said links are permitted to articulate in one direction, but prevented from articulation in the opposite direction, the pivotal connection between said links including bolts each of which has an eccentric portion engaging the male part of an adjacent link.

6. An endless track band, comprising a multiplicity of links, each link having a tread formed integrally with the link, said links being of the hermaphrodite type, said links being hollow, there being formed on the male part of each link an extension entering the hollow space in the link and normally bearing against an adjacent link, said links being connected by bolts, each bolt having an eccentric portion engaging the male part of an adjacent link, there being means on each bolt indicating the position of said eccentric portion.

In testimony that I claim the foregoing as my invention, I have hereunto set my hand.

ORLEY C. HOUGHTON.